Jan. 28, 1941. C. W. SERVICE ET AL 2,229,939

MOTOR STARTER

Filed April 29, 1938 2 Sheets-Sheet 1

INVENTORS
CHARLES WILLIAM SERVICE
AND ANGELO ARRIGHI
BY
ATTORNEYS

Jan. 28, 1941.  C. W. SERVICE ET AL  2,229,939
MOTOR STARTER
Filed April 29, 1938  2 Sheets-Sheet 2

INVENTORS
CHARLES WILLIAM SERVICE
AND ANGELO ARRIGHI
BY
ATTORNEYS

Patented Jan. 28, 1941

2,229,939

UNITED STATES PATENT OFFICE 2,229,939

MOTOR STARTER

Charles William Service, Richmond Hill, N. Y., and Angelo Arrighi, Union City, N. J., assignors to American Safety Razor Corporation, Brooklyn, N. Y., a corporation of Virginia Application April 29, 1938, Serial No. 204,982

15 Claims. (Cl. 172—36)

This invention relates generally to starting devices for electric motors and more particularly to starting devices for electric motors of the magnetic type. More particularly it relates to starting devices for bringing the armature of such a motor into a predetermined position so as to insure starting of the motor when electrical forces are impressed on it.

From another aspect the invention relates to a switch that will control the current flow into an electric motor of the magnetic type and will be operative at the same time to effect the starting of the motor.

While the invention has been disclosed as applied to electric motors of the magnetic type, it is to be understood that it is not necessarily restricted to such application and that as to certain phases thereof it may have other applications.

Among the general objects of the invention is the provision of a simple, effective and economical arrangement for effecting the starting of an electric motor of the magnetic type.

The conventional motor of the magnetic type comprises a field magnet that is energized so as to attract to the poles thereof a rotatable armature. For the purpose of securing rotation of the armature the field magnet is energized and deenergized at appropriate times in synchronism with the rotation of the armature. In one of the conventional types of magnetic motor a make and break mechanism for the field circuit of the motor is actuated by a cam or eccentric on the armature shaft.

A motor of the magnetic type can start only under certain conditions. If the armature is in such a position that the make and break is open it is obvious that the motor will not start. On the other hand the make and break may be closed and yet the armature be in such a position that the motor cannot start. It is therefore necessary before the motor can start that the armature be in certain predetermined positions in relation to the field. If the armature is not in one of these positions, which may be described as starting positions, the motor will not start, and before it will start the armature must be moved into a starting position.

Among the more particular objects of this invention is therefore the provision in an electric motor of the magnetic type of means for moving the armature thereof into a starting position.

Among the further objects of the invention is the provision of a single means for controlling the flow of current into the motor and for bringing the armature into a starting position.

Another object of the invention is the provision of a single means for controlling the flow of current into the motor and for bringing the armature into a starting position unless it is already in such a position.

Among the objects of this invention is further the provision in a motor of the magnetic type of means, operative only when the armature is not in a starting position, for moving it into a starting position.

These objects and such other objects as will hereinafter appear or be pointed out are attained in the illustrative embodiments of the invention shown in the drawings, in which.

Figure 1:
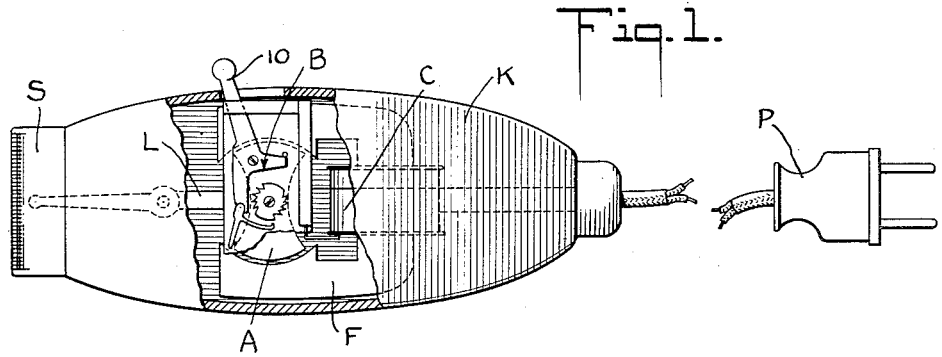
Figure 1 is a plan view of a dry shaver of conventional type showing the invention applied thereto.

Referring now to the drawings in detail, in Figure 1 thereof the invention has been shown as applied to a "dry shaver" of conventional type, that is to say, to a shaving device in which the shaving operation is effected by relatively movable cutting teeth, and for effecting the relative movement of the cutting teeth an electric motor of the magnetic type has been shown.

F and A in Figure 1 indicate respectively the field magnet and the armature of a motor of the magnetic type. C indicates the field coil by which the field magnet F is energized. The field coil C may be energized from any suitable source of electric current by electrical connections terminating in a plug P of conventional type, which may be connected to the current source.

L indicates a device, such as a lever, for transmitting motion from the armature shaft to the shaving head, indicated at S.

A make and break arrangement is located in the circuit of the field coil C, and this make and break arrangement is operated in synchronism with the rotation of the armature, for which purposes an eccentric is customarily placed on the armature shaft which closes the make and break at appropriate times. For the sake of simplicity this make and break has been omitted in the showing of Figure 1.

The whole mechanism is shown as housed in the casing K.

As already explained it is characteristic of a motor of the magnetic type that it will start only under certain conditions, and this invention aims to provide a construction for effecting the starting and for controlling the current input into the motor. A construction for this purpose has been indicated as a whole in Figure 1 by the letter B. For a full understanding of the details thereof reference may be had to Figure 2.

Figure 2:
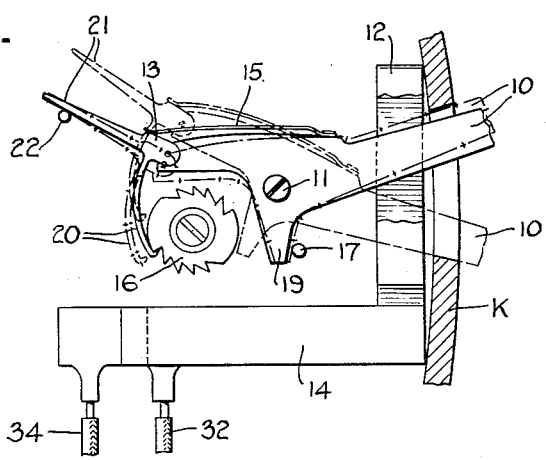
Figure 2 is a plan view, on a greatly enlarged scale, of one embodiment of the invention.

In Figure 2 is shown a lever 10 pivoted at 11 and carrying at one end a member 13 having an extension 20 in the form of a dog or pawl adapted to engage the teeth of a ratchet 16 that is mounted on the armature shaft. The pawl 20 is pressed into engagement with the teeth of the ratchet 16 through the action of a spring 15 carried on the lever 10 and pressing against the member 13. The lever 10 is provided with a portion that extends beyond the casing of the motor K and that may be engaged by the fingers of a user to thereby move the lever 10, from a position indicated in cross and dash lines to a position indicated in dot and dash lines.

A stop 17 may be provided to limit the movement of the lever 10 beyond the cross and dash line position, which may be described as the initial position, and for this purpose the lever is provided with an extension 19 that engages the stop 17. When the lever is in this cross and dash line position an extension 21 of the member 13 engages a stop 22, and the member is thereby deflected into the position indicated in cross and dash lines, in which the pawl 20 no longer engages the teeth of the ratchet 16 and the armature shaft is free to turn.

As the lever is moved from this initial position to the dot and dash line position it passes first of all into the full line position in which the portion 20 engages the teeth of the ratchet 16 and thereby causes rotation of the ratchet and of the armature shaft, until the lever 10 reaches the dot and dash position in which the portion 20 is no longer in engagement with the ratchet 16 so that the armature shaft is again free to rotate. The parts are preferably so designed that during the movement of lever 10 just described, the armature reaches a starting position, and in the illustrated embodiments, this movement can be effected by a throw of the lever to give a sudden impulse to the armature.

The dot and dash or final position of the lever 10 may be determined by a stop or it may be determined by the walls of the slot in the casing K through which the lever 10 projects.

The movement of the lever 10 effects not only the movement of the armature but also the operation of a switch controlling the motor circuit, now to be described, so that at a predetermined time after the movement of the armature has begun, the switch is closed. In the illustrated embodiment the switch contacts are closed at about or a little after the time that the armature reaches a starting position. However it will be obvious that to accomplish the purpose intended the switch might be closed before the armature reaches the starting position, since it is only necessary in order to effect starting that there is a time, however short, when the switch is in a closed position at the same time that the armature is in a starting position.

Figure 3:
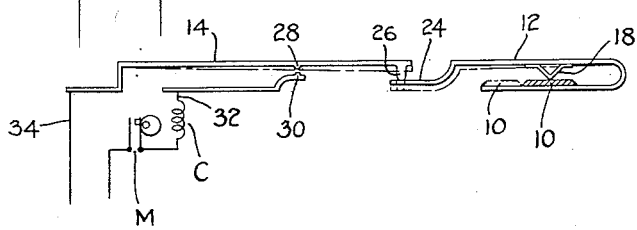
Figure 3 is a diagrammatic view, of the electrical connections of the embodiment of Figure 2.

In Figure 3, which shows the electrical connections diagrammatically the lever 10 is shown as movable between a doubled over spring 12 that carries a cam 18 on the leg 24 thereof. The spring 12 is so dimensioned that the leg 24 thereof tends to move down into the dot and dash position of Figure 3 when it is released. When lever 10 is in the cross and dash line position (see Figure 2) and when it is in its full line position (see Figures 2 and 3), it engages the cam 18 and prevents the movement of the end portion 24 into the dot and dash line position, but as the movement of the lever 10 continues, it releases the cam 18 and the portion 24 is free to move into the dot and dash line position. The leg 24 of spring 12 serves to support the end 26 of a spring 14, which spring is an electrical conductor and is tensioned so that its end portion 26 tends to move into the dot and dash line position of Figure 3. When the portion 26 is raised an electrical contact 28 carried by the spring 14 is separated from an electrical contact 30, which together with contact 28 constitutes a switch, in series with the motor circuit. When the end portion 26 of spring 14 drops, the spring 14 assumes the dot and dash position shown in Figure 3 and the contacts 28 and 30 touch each other closing the motor circuit which is shown as comprising the leads 32 and 34, the field coil C and make and break mechanism M that is indicated as operated from an eccentric on the armature shaft so as to cause intermittent energization of the field coil in synchronism with the rotation of the armature.

From the above description it will be clear that the motor cannot start while lever 10 is in its initial (cross and dash line of Figure 2) position. If the motor is to be started the lever 10 must be moved until the armature has reached a starting position in which the motor circuit is closed by the make and break M and in which the switch 28, 30 is also closed.

It will be observed that the rotation of the armature by the starting mechanism is unidirectional. Since motors of the magnetic type as ordinarily constructed can rotate only in one direction this is all that is required. However the invention can also be applied to reversible motors of this type. For instance, it is merely necessary to provide a duplicate mechanism for causing rotation in the opposite direction. This mechanism can then be made to become operative while the other mechanism is rendered inoperative, at the same time that the motor is adjusted for reverse rotation.

It will be observed that the ratchet 16 has been shown in Figure 2 as having teeth only at certain portions of its periphery. While the device would function if teeth were provided all around the periphery of the ratchet 16 it is not necessary to have the teeth so distributed since it is only necessary to rotate the armature by means of the lever 10 when the armature is in a nonstarting position. If, on the other hand, the armature is already in a starting position, movement of the armature by lever 10 is unnecessary as the motor will commence to operate just as soon as connection is made to the source of power and the lever 10 closes the switch 28, 30.

Figure 4:
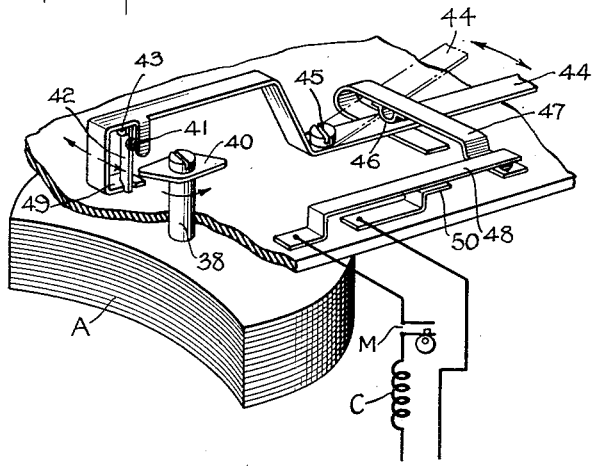
Figure 4 is a perspective view on an enlarged scale of another embodiment of the invention.

A second embodiment of this invention is illustrated in Figure 4. In this figure which is diagrammatic as to a part of the electrical connections the armature is shown at A, and its shaft 38 is shown as carrying a member 40. The member 40 is shown as having projecting portions that are adapted to extend across the path of movement of a one way pawl 42 carried on the end of a lever 44. The latter is pivoted at 45 and extends between the legs of the doubled over spring 47. The latter carries a cam 46 that is adapted to engage the lever 44 and to be raised thereby, so as to raise the cam carrying portion of the spring. When the lever 44 is moved out of engagement with the cam, the cam carrying portion of the spring drops.

The pawl 42 is shown as pivoted at one end thereof as indicated at 43, and a spring 41 is shown as pressing it against the abutment 49 provided on the end of the lever 44, so that the pawl 42 is operative to rotate the armature shaft in a counterclockwise direction as viewed from above.

The function of the spring 47 is identical with that described in connection with the spring 12 in Figure 3 in that it closes the motor circuit by permitting a spring 49 to drop and to effect the touching of a pair of contacts indicated at 50 so as to permit operation of the motor if the armature is in a starting position.

The elements of the electric circuit of the motor have been denoted as before by the letter M for the make and break and C for the field coil.

In this embodiment, as in the preceding embodiment, the member 40 may assume such a position that the armature shaft is not actuated by the pawl 42. However when this occurs the armature will already be in a starting position, and the motor will start as soon as the device is connected to a source of power and as soon as the lever 44 is thrown into a position in which the contacts 50 close.

Figure 5:
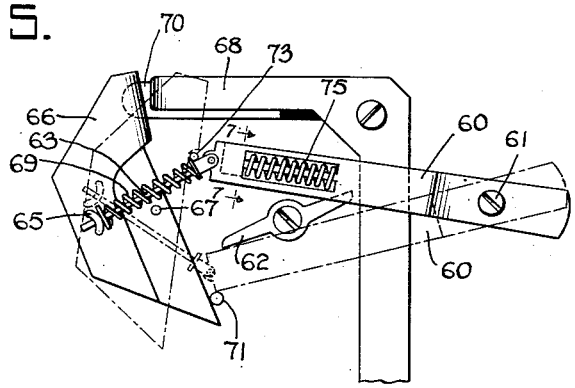
Figure 5 is a plan view of an enlarged scale of still another embodiment of the invention.
Figure 6:
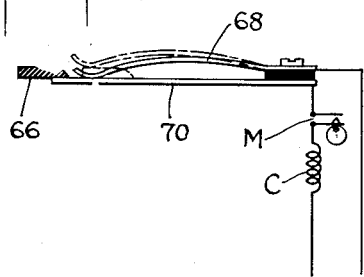
Figure 6 is in part an elevation of a detail of the embodiment of Figure 5 and in part a diagrammatic view of the electrical connections of the embodiment of Figure 5.
Figure 7:
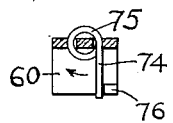
Figure 7 is a sectional view on an enlarged scale taken substantially on the line 7—7 of Figure 5, looking in the direction of the arrows.

In Figures 5, 6 and 7 I have illustrated an embodiment of the invention in which the armature rotating arrangement is combined with a quick break switch. Due to the quick break action the armature is automatically given a sudden kick at a velocity that does not depend on the volition of the operator and results in a "spinning" of the armature.

The switch mechanism in this embodiment comprises a conductor 70 connected to one side of the motor circuit comprising the make and break M and the field coil C, and a spring 62 connected to the other side of the motor. The spring tends to make contact with the member 70 when released.

The switch further comprises a movable member 66, pivoted at 67, and comprising an insulating portion that may move between the spring 68 and the member 70 so as to separate them and break the motor circuit. This position is indicated in dot and dash lines in Figure 6 and may be called the initial position of the member 66. When the member is moved into the full line position of Figures 5 and 6, the motor circuit is closed. An operating lever 60 is shown as pivoted at 61 and as carrying at its end a pivoted link 63, that is slidable in an ear 65 carried by the member 66 and is urged away from the ear by a spring 69. It will be observed that this construction constitutes a toggle arrangement, by means of which the element 66 will be caused to tend to assume either one of its extreme positions on opposite sides of its dead center position, which is that position in which the link 63 is in line with the lever 60. The positions of this toggle system may be limited in any suitable or preferred manner, as, for example, by a stop 71 engaging the lever 60 on the one hand, and by a stop 73 engaging the element 66 on the other hand.

A one way pawl arrangement is carried on the lever 60, and serves to engage the projecting portions of a member 62 to rotate the armature shaft when the switch member 66 is moved into the position in which the switch closes. It has been shown as constituted by the end 74 of a spring 75 carried by the lever 60. A stop 76 also on the end of the lever 60 limits the movement of the end 74 of the spring 75 in one direction.

While there have herein been disclosed several illustrative embodiments of the invention it will be understood that the same may be embodied in many other forms without departing from the spirit thereof as will be obvious to those skilled in the art and that the disclosure herein is by way of illustration merely, and is not to be interpreted in a limiting sense, and that no limitation is to be read into the disclosure other than as called for by the prior art.

Having thus described the invention and illustrated its use, what is claimed as new and desired to secure by Letters Patents, is:

1. For use with an electric motor of the magnetic type, starting mechanism comprising a manually operable lever, complementary means on said lever and on the armature shaft whereby unidirectional movement of the armature may be effected to bring it into a starting position, a switch that tends normally, when free to move, always to close the motor circuit, and means associated with said starting lever for holding said switch in an open position at the start of its armature operating movement, and for releasing the switch so that it closes after the armature has moved.

2. For use with an electric motor of the magnetic type, starting mechanism comprising a manually operable member, complementary means on said member and on the armature shaft whereby unidirectional movement of the armature in its normal direction of rotation may be effected to bring it into a starting position, a switch that tends normally to close the motor circuit, and means associated with said member for holding said switch in an open position at the start of its armature operating movement, and for releasing the switch so that it closes after the armature has moved.

3. For use with an electric motor of the magnetic type, starting mechanism comprising a movable member, complementary means associating said member and said armature shaft whereby the armature may be moved into a starting position, a switch that always tends normally to close the motor circuit and means associated with said movable member for holding said switch in an open position at the start of its armature operating movement and for releasing the switch so that it closes after the armature has moved.

4. For use with an electric motor of the magnetic type, starting mechanism comprising manually operable means for moving the armature in its normal direction of rotation into a starting position, a switch that tends normally to close the motor circuit, and means associated with said manually operable means for holding said switch in an open position at the start of its armature moving operation, and for releasing the switch so that it closes after the armature has moved.

5. For use with an electric motor of the magnetic type, starting mechanism comprising a manually operable lever, complementary means on said lever and on the armature shaft whereby unidirectional movement of the armature may be effected to bring it into a starting position, a switch that tends normally to close the motor circuit, and means associated with said starting lever for holding said switch in an open position at the start of its armature operating movement, and for releasing the switch so that it closes after the armature has moved and said complementary armature moving means being operative only when the armature is in a non-starting position.

6. For use with an electric motor of the magnetic type, starting mechanism comprising a movable member, complementary means associating said member and said armature shaft whereby the armature may be moved into a starting position, a switch that tends normally to close the motor circuit and means associated with said movable member for holding said switch in an open position at the start of its armature operating movement and for releasing the switch so that it closes after the armature has moved and said complementary armature moving means being operative only when the armature is in a non-starting position.

7. For use with an electric motor of the magnetic type, starting mechanism comprising manually operable means for moving the armature into a starting position, a switch that tends normally to close the motor circuit, and means associated with said manually operable means for holding said switch in an open position at the start of its armature moving operation, and for releasing the switch so that it closes after the armature has moved and said armature moving means being operative only when the armature is in a non-starting position.

8. An electric motor of the magnetic type having starting means comprising a ratchet wheel carried on the armature shaft, a movable member carrying a pawl adapted to engage the teeth of said ratchet wheel, and a switch for opening and closing the motor circuit, and means carried by said movable member and operating to bias the switch for preventing the closing of said switch when said member is in certain positions.

9. In an electric motor of the magnetic type, starting means comprising a ratchet wheel carried on the armature shaft having toothed sections at spaced intervals on its periphery, a movable member carrying a pawl adapted to engage the teeth of said ratchet, a switch for opening and closing the motor circuit, and means operable by the movement of said movable member to assume positions in which it biases the switch and prevents the closing of said switch and to assume other positions in which it permits the switch to close.

10. Starting means for an electric motor of the magnetic type comprising projections carried by the armature shaft, said starting mechanism comprising an arrangement including a one way pawl adapted to engage said projections and to spin said armature only in one direction which is that of its normal rotation, switch means for making or breaking the motor circuit, and tending to assume a normal position in which the motor circuit is closed, and means adapted to hold the switch in an open position, said means being effective to hold the switch open when said arrangement is in its initial position and being adapted to move into a position in which it permits the switch to close when said starting arrangement is operated to move the armature.

11. Starting means for an electric motor of the magnetic type comprising a projection carried by the armature shaft said starting mechanism comprising a pawl for engaging said projection to move said armature into a starting position in a direction which is that of its normal rotation, switch means for making or breaking the motor circuit, said switch means always tending to assume a normal position in which the motor circuit is closed, and means adapted to hold the switch in an open position and to move into a position in which it permits the switch to close when said starting mechanism moves the armature.

12. For starting an electric motor of the magnetic type, a projection carried by the armature shaft, means to engage said projection and to spin the armature, said means comprising two pivotally connected members, one of said members being pivotally mounted and the second of said members being slidably and pivotally mounted on a pivotally mounted carrier, resilient means urging said second member to move away from its carrier and a pawl adapted to engage said projection carried by said first mentioned member.

13. For starting an electic motor of the magnetic type, a projection on the armature shaft, a switch for opening and closing the motor circuit, said switch comprising a pair of contacts tending normally to touch each other, and a pivotally mounted member adapted to separate said contacts, and means adapted to effect movement of said member and to engage said projection so as to move the armature shaft.

14. In an electric motor starting device a pair of terminals adapted normally to move into contact so as to close the motor circuit, means adapted to be positioned so as to separate said contacts and to be moved into a position where it permits said contacts to close and while being so moved to impart movement to the armature shaft.

15. For starting an electric motor of the magnetic type, a projection carried by the armature shaft, means to engage said projection and to spin the armature, said means comprising two pivotally connected members, one of said members being pivotally mounted and the second of said members being slidably and pivotally mounted on a pivotally mounted carrier, resilient means urging said second member to move away from its carrier and a pawl adapted to engage said projection carried by said first mentioned member, a pair of contacts adapted to close the circuits of said motor when they touch each other and so positioned relatively to said carrier that the latter in one of its limiting positions separates them, and in the other of its limiting positions permits them to close.

CHARLES WM. SERVICE.
ANGELO ARRIGHI.